United States Patent Office 3,443,895
Patented May 13, 1969

3,443,895
PROCESS FOR PRODUCING KAPPA ALUMINA
Walter H. Gitzen, Belleville, Ill., and Leroy D. Hart, St. Louis, Mo., assignors to Aluminum Company of America, Pittsburgh, Pa., a corporation of Pennsylvania
No Drawing. Filed Aug. 30, 1966, Ser. No. 575,977
Int. Cl. C01f 7/00
U.S. Cl. 23—142     4 Claims

ABSTRACT OF THE DISCLOSURE

Mixing a siliceous material with particles of alumina trihydrate and heating the resultant mixture at a temperature of 950° to 1100° C. to convert the alumina trihydrate to kappa alumina.

This invention relates to a method for producing kappa phase alumina. More particularly the invention is directed to producing a high yield of kappa phase alumina from alumina trihydrate.

In conventional methods of producing kappa phase alumina, various techniques utilizing thermal decomposition of hydrated alumina have been employed. These techniques usually include controlled dehydration of alumina trihydrate to produce intermediate phase chi and then upon further dehydration a certain amount of kappa phase alumina is yielded and ultimately alpha phase alumina is formed. Although by controlling the dehydration process kappa phase alumina is produced, the resultant product also contains other crystalline phases of alumina. This is particularly true in preparing kappa alumina on a commercial scale where the temperature of the material being treated is critical and control of the proper temperature is difficult. Ideally, to produce kappa phase alumina without any contamination or at least a very small amount of other phase aluminas in the final product, the transition of kappa phase to alpha phase should be repressed until as much of the kappa phase is formed as possible.

A discussion of kappa phase alumina and the method of detecting kappa phase alumina by X-ray powder diffraction patterns is found in "Technical Paper No. 10, Second Revision, Alumina Properties," J. W. Newsome, H. W. Heiser, A. S. Russell, H. C. Stumpf, Aluminum Company of America, 1960.

Kappa alumina is used as a polishing agent for mild abrasive, particularly as a dentifrice abrasive. For this type of application, it is very desirable to employ substantially pure kappa alumina free from contamination by other alumina phases, especially alpha alumina, which is a harsher abrasive.

It is an object of this invention to provide a new and improved method of producing kappa phase alumina.

Another object of the invention is to provide a new and improved method of producing kappa phase alumina which is substantially free of other crystalline phases of alumina.

In accordance with this invention, it has been found that when a mixture of siliceous material and alumina trihydrate particles is heated to a temperature of 950° to 1100° C., the alumina trihydrate is converted to kappa phase alumina. The process produces a high yield of kappa phase alumina, i.e., at least 50 percent of kappa phase alumina, the balance of the resultant product being substantially amorphous material. This high yield of kappa alumina is thought to be caused by the siliceous material acting to suppress the transition of kappa phase alumina to alpha phase at the elevated temperatures. A maximum amount of kappa phase alumina is thereby formed before the material starts converting to alpha phase alumina. Generally, the period of heating within the foregoing temperature range should be for a sufficient length of time to convert the alumina trihydrate to kappa phase alumina, and in commercial practice it usually extends over a period of about 30 minutes to 4 hours, the length of time being dependent upon the temperature, mass of the mixture being heated, and the amount of siliceous material added. The term "siliceous material" as used herein means a material that will provide silica values which, when mixed with alumina trihydrate and heated in accordance with the invention, will aid in the conversion of the alumina trihydrate to kappa phase alumina.

The siliceous material may be added to the alumina trihydrate particles in various forms, such as, for example, silicic acid, bentonite clay, flint, or colloidal silica. The siliceous material should, as a practical matter, be of a particle size fine enough, preferably to substantially pass a 325 mesh screen, to insure good dispersion of the additive in the alumina trihydrate. The amount of siliceous material added for maximum conversion to kappa phase alumina should be equivalent to 1 to 14%, by weight, of $SiO_2$, on the basis of $Al_2O_3$.

The improvement in producing an alumina having at least 50%, by weight, kappa phase from alumina trihydrate by adding a siliceous material and thereafter heating the resultant mixture in accordance with the invention is illustrated in the following example.

Example

A batch of alumina trihydrate particles produced by the conventional Bayer process was divided into two lots. Lot A consisted of only the alumina trihydrate with no additive. Lot B had silicic acid mixed with the alumina trihydrate in an amount equivalent to 3 per cent, by weight, $SiO_2$ based on $Al_2O_3$. Both Lot A and Lot B were heated separately at 1000° C., for one hour, under identical conditions.

X-ray diffraction analysis was performed on the resultant product of both Lot A and Lot B. The product obtained from Lot A contained no kappa phase alumina and 15% alpha phase alumina. However, the product obtained from Lot B contained over 75% kappa alumina, with no detectable alpha phase alumina.

While the invention has been described and the preferred modes of practicing the invention have been set forth, it will be obvious to those skilled in the art that modifications of the invention are possible without departing from the scope thereof.

What is claimed is:

1. A method of producing kappa alumina which comprises
   mixing a siliceous material with particles of alumina trihydrate, and heating the resultant mixture at a temperature of 950° to 1100° centigrade for a sufficient time to convert the alumina trihydrate to alumina containing at least 50% by weight kappa alumina, said siliceous material being present in an amount sufficient to cause conversion of said alumina trihydrate to said alumina containing at least 50% by weight kappa phase upon heating at said temperature of 950° to 1100° centigrade, said siliceous material being a material that will provide silica values which, when mixed with alumina trihydrate and heated at said temperature of 950° to 1100° centigrade for said sufficient time, will aid in converting said alumina trihydrate to said alumina containing at least 50% by weight kappa alumina.

2. A method of producing kappa phase alumina in accordance with claim 1 wherein the siliceous material is added ot the alumina trihydrate in an amount equivalent to 1 to 14 percent $SiO_2$, by weight, based on $Al_2O_3$.

3. The method of claim 1 wherein the siliceous material is silicic acid, bentonite clay, flint, or collodial silica.

4. A method of producing kappa alumina which comprises mixing with alumina trihydrate particles a siliceous material in an amount equivalent to 1 to 14% $SiO_2$ by weight based on $Al_2O_3$, and heating the resultant mixture at a temperature of 950° to 1100° centigrade for a period of from 30 minutes to 4 hours to convert the alumina trihydrate to alumina containing at least 50% by weight kappa phase alumina, said siliceous material being a material that will provide silica values which, when mixed with alumina trihydrated and heated at said temperature of 950° to 1100 C. for said period of from 30 minutes to 4 hours, will aid in converting said alumina trihydrate to said alumina containing at least 50% by weight kappa alumina.

References Cited

UNITED STATES PATENTS

| | | |
|---|---|---|
| 2,398,610 | 4/1946 | Bailey et al. _____ 23—143 X |
| 2,437,531 | 3/1948 | Huffman _____ 208—136 |
| 3,003,919 | 10/1961 | Broge _____ 23—142 X |
| 3,106,452 | 10/1963 | Watson et al. |
| 3,227,521 | 1/1966 | Carithers et al. |
| 3,261,703 | 7/1966 | Hart et al. |

OTHER REFERENCES

Newsome et al., "Alumina Properties," Aluminum Co. of America, 1960, pp. 11 and 46. TA 480 A6A62.

OSCAR R. VERTIZ, *Primary Examiner.*

G. T. OZAKI, *Assistant Examiner.*